Jan. 27, 1959     C. R. BROWN     2,870,600
VARIABLE EJECTOR FOR IRIS NOZZLES
Filed Dec. 27, 1954     2 Sheets-Sheet 1
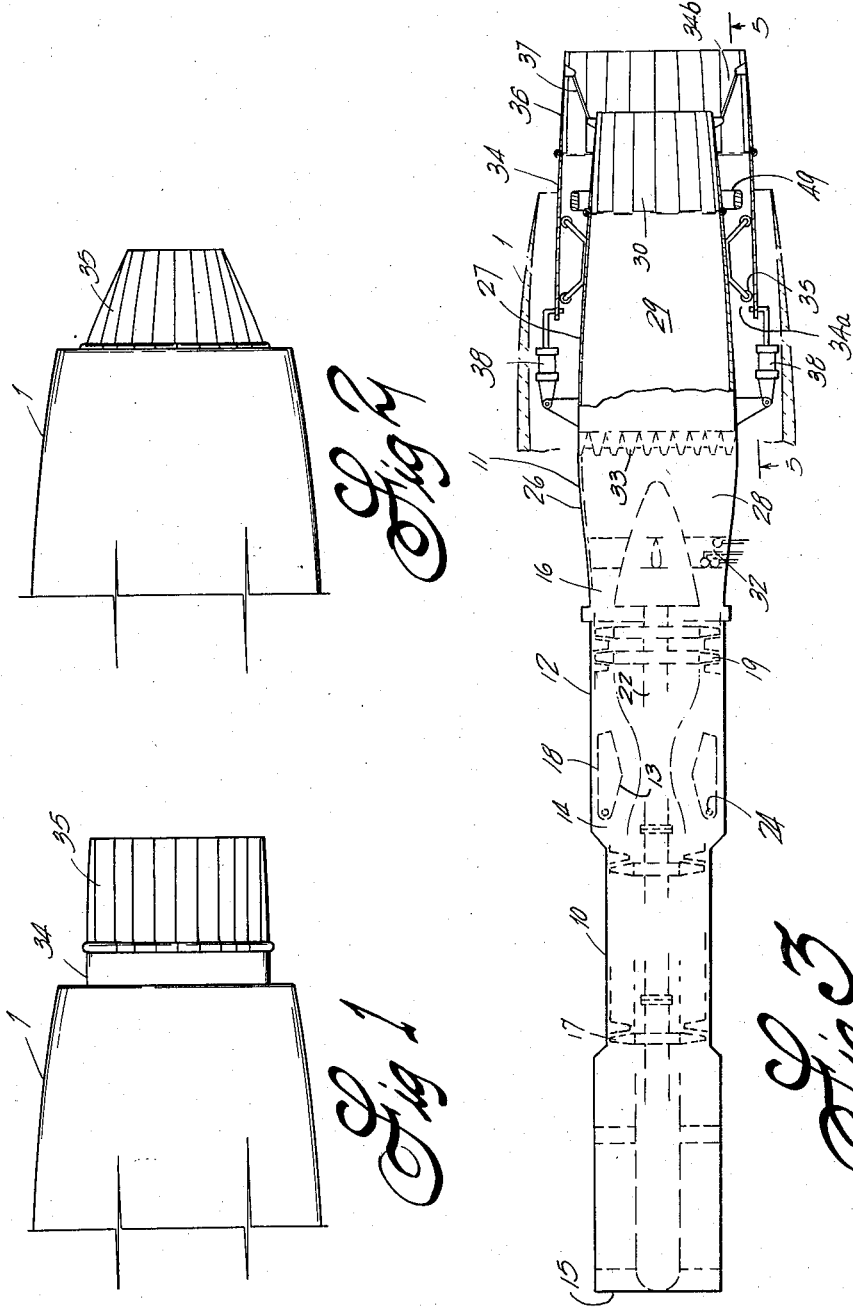
INVENTOR.
CHARLES R. BROWN
BY
Arthur L. Collins
ATTORNEY Jan. 27, 1959    C. R. BROWN    2,870,600
VARIABLE EJECTOR FOR IRIS NOZZLES
Filed Dec. 27, 1954
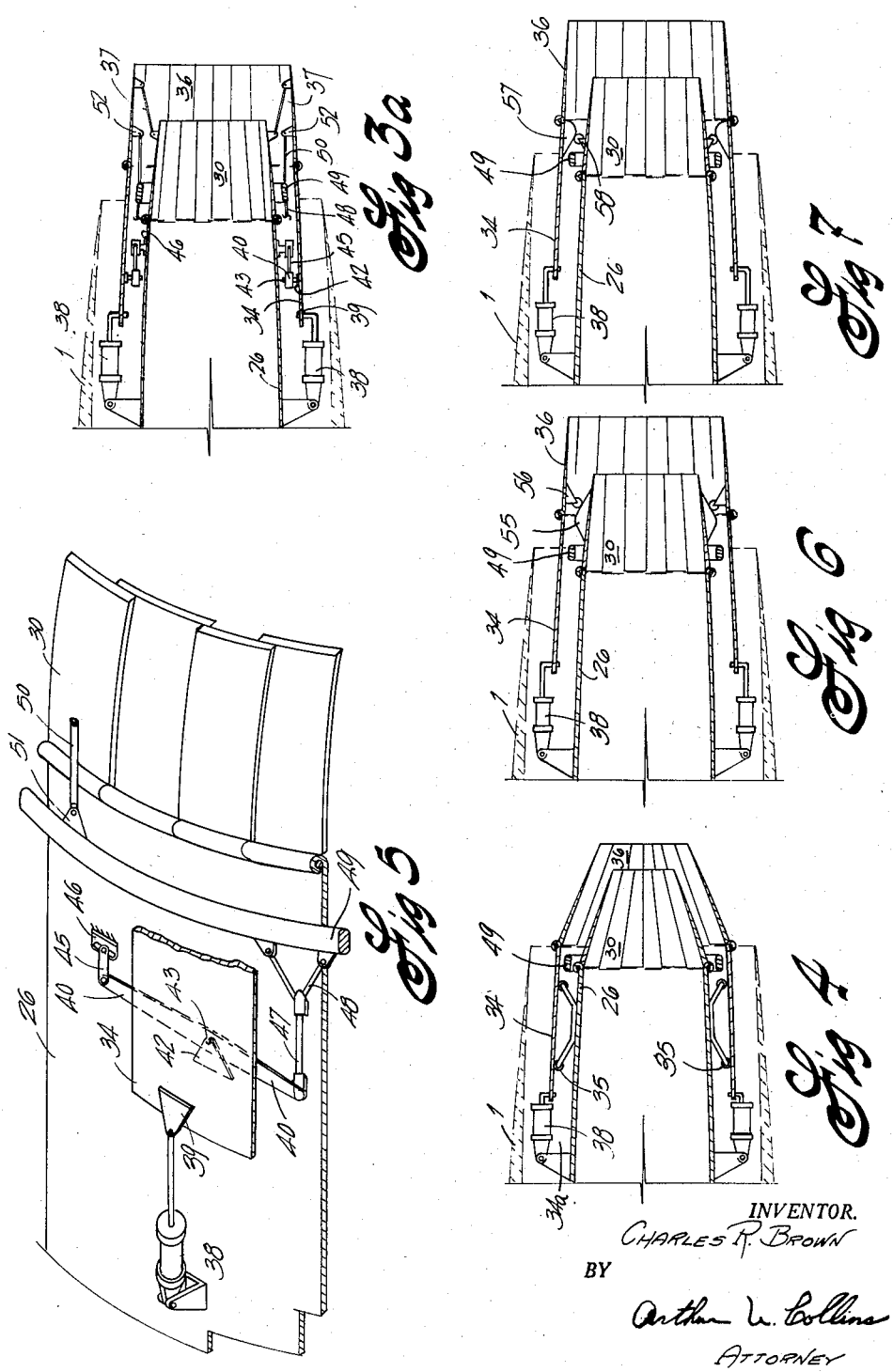
INVENTOR.
CHARLES R. BROWN
BY
Arthur L. Collins
ATTORNEY United States Patent Office 2,870,600
Patented Jan. 27, 1959

2,870,600

VARIABLE EJECTOR FOR IRIS NOZZLES

Charles R. Brown, Mission, Kans., assignor, by mesne assignments, to the United States of America as represented by the Secretary of the Navy Application December 27, 1954, Serial No. 477,961

5 Claims. (Cl. 60—35.6)

This invention relates to aviation gas turbine power plants of the type equipped with means for cooling such a power plant adjacent the exhaust nozzle thereof.

It is old in the art of jet engines to equip the exhaust nozzle of the engine with suitably operable shutter elements designed to effect variations in the flow area of the nozzle. In accordance with the varying power requirements of the engine these shutter elements are operated to increase or diminish the exhaust nozzle openings in order to best fit the needs of the aircraft and the engine in a given state of operation.

Another requirement of such engines is the provision of some sort of means for supplying cooling air in the vicinity of the exhaust end as this end tends to become quite hot particularly when the engine includes an afterburner or thrust augmentor apparatus for burning additional fuel down stream of the usual turbine which drives the compressor. Such cooling is necessary in order to avoid undue thermal expansion and consequent structural strains on the nozzle and rear casing of the apparatus.

The problem of providing the cooling air has been solved by the addition of an ejector or sleeve surrounding the rear portion of the engine and extending over the exhaust nozzle. Such cooling or ejection means, of course, increases the overall cross-sectional area of the engine and adds to its drag. In the case of engines provided with variable exhaust nozzles, the cooling ejectors presently in use do not afford any way of adapting themselves to the smaller nozzle cross-sectional area achieved when the closure elements regulating the nozzle opening are closed. Such a reduction occurs particularly in the iris type nozzle employing a plurality of pivoted flaps.

Therefore, it is an object of this invention to provide a variable ejector to eliminate excessive drag at high flight speeds.

It is another object of this invention to provide a cooling ejector for aviation gas turbine which has a portion reducible in cross-sectional area when the exhaust nozzle is reduced in cross-sectional area.

It is still another object of this invention to provide a cooling ejector for gas turbines which ejector has a portion reducible in cross-sectional area and in which the ejector area reduction is coordinated with the reduction in area of the turbine exhaust in accordance with a predetermined relationship.

It is a further object of this invention to provide a cooling ejector for gas turbines which ejector has a plurality of pivoted plates thereon and means moving the plates to an open or closed position whereby the ejector cross-sectional area may be raised.

Other objects and many of the attendant advantages of this invention will be readily appreciated as the same becomes better understood by reference to the following detailed description when considered in connection with the accompanying drawings wherein:

Figure 1 is a side view of an airframe carrying an engine equipped with the variable ejector in its open position.

Figure 2 is a view similar to Figure 1 showing the ejector in its closed position.

Figure 3 is a schematic elevational view of a typical aviation turbo jet power plant having an afterburner, a variable nozzle and a variable ejector constructed in accordance with the invention.

Figure 3a is a schematic view in detail of a variable nozzle and a variable ejector constructed in accordance with the invention.

Figure 4 is a partial view similar to Figure 3 showing the nozzle and the ejector in their closed position.

Figure 5 is a perspective view of the outer casing of the afterburner with a section of the ejector sleeve cut away thereby showing the details of the ejector iris actuating linkage.

Figure 6 is a schematic view of a modified form of a means coordinating the movement of the ejector iris and the nozzle iris.

Figure 7 is a schematic view of a second modified form of a means coordinating the movement of the ejector iris and the nozzle iris.

As shown in Figure 3 of the drawing, the power plant may comprise a turbo jet engine 10 and tailburner apparatus 11, both of which have substantially cylindrical casing structures mounted in coaxial alignment and adapted to be supported in the fuselage or wing 1 of an aircraft. The turbo jet engine includes an outer casing 12 and an inner core structure generally indicated at 13, which forms an annular passageway 14 extending longitudinally through the engine from a forwardly directed air intake opening 15 to a rearwardly disposed turbine discharge passage 16. Operating elements of the turbo jet engine are mounted in axial alignment to minimize frontal area, and include an axial-flow compressor 17, an annular combustion apparatus 18, and a turbine 19, the rotor of which is operatively connected to the rotor of the compressor through the medium of a common shaft 22 that is suitably journalled within the case structure 13. In operation, air entering the intake opening 15 is compressed by the compressor 17 and delivered to the combustion apparatus 18, where fuel supplied by the nozzle 24 is burned to form hot motive fluid, which is expanded through the turbine 19 for driving the compressor 17, and thence supplied through the discharge passage 16 into the afterburner apparatus 11.

The afterburner apparatus 11 may include a generally cylindrical outer casing 26, the forward end of which is suitably secured to the turbine discharge end of the engine structure 12. Formed in the casing 26 is an auxiliary combustion chamber 28, which communicates with the aforesaid turbine discharge passage 16 and terminates in a jet discharge opening or nozzle 29, the flow area of which is variable in accordance with the positioning of movable flaps or closures 30. The flaps 30 are pivoted on the casing 26 and form an iris structure positioned by means to be described hereinafter. Auxiliary fuel supply nozzles 32 are mounted in the combustion chamber 28 for feeding fuel into the path of the heated air and gases flowing from the turbine discharge passage 16. An apertured baffle or flame holder 33 may also be carried in the combustion chamber 28 downstream of the nozzles 32. It will be understood that when it is desired to operate the afterburner apparatus, fuel will be automatically supplied by way of the nozzles 32 to be burned in the chamber 28 to provide additional thrust energy upon final discharge of the heated motive fluid to the atmosphere through the nozzle 29. At the same time, the flaps or iris 30 will be retracted to a fully opened position substantially as illustrated in Figures 1, 3, 6 and 7.

It will be noted that the downstream portion 27 of the cylindrical afterburner casing 26 converges somewhat to define the nozzle opening. Mounted around the portion 27 and spaced therefrom by means of guide rollers 35 is the ejector formed by a casing or sleeve 34. The sleeve provides an upstream opening 34a and a downstream opening 34b. Pivotally mounted on the downstream of the casing 34 are a plurality of flaps or closures 36. The flaps 36 are connected by pivotally mounted links 37 to selected members of the set of flaps 30 so that motion of one set of flaps will cause a corresponding motion of the other in accordance with a predetermined relationship. In each set of flaps the ends of every other flap overlie the intermediate flaps so that the means controlling the flaps need not have a direct connection to each flap but motion caused by a control means described below in selected flaps in one set will be transmitted to all others in this set by this overlying feature and to the flaps of the other set by the links 37. It can be seen that when each set of flaps is rotated inwardly to a closed position the amount of overlie of adjoining flaps will be increased thus creating an iris controlling the flow area of the discharge nozzle 29.

The means controlling the iris opening comprises a plurality of fluid motors or similar means 38 anchored on the casing 26 and connected to the sleeve 34 by the links 39. One or more transversely extending levers or links 40 between casings 26 and 34 is pivotally mounted as at 43 on a bracket 42 secured to the sleeve 34 and movable therewith. One end of lever 40 is connected by the link 45 in the slotted bracket 46 anchored in the casing 26. The other end of the link 40 is connected by the bar 47 and rods 48 to the unison ring 49 freely suspended between casing 26 and sleeve 34. Rods 50 pivotally connected at 51 to the unison ring and at 52 to the inner side of selected flaps 36 complete the actuating mechanism for positioning the iris. Upon proper control of the motor 38 to retract the piston rod into the cylinder, the sleeve 34 is pulled upstream. The bracket 42 is moved upstream as it is anchored to the moving sleeve and pivots the lever 40 about the bracket 46. This action causes the link 47 to pull the unison ring in the same direction and the flaps 36 rotate inwardly or to a closed position about their pivots on the casing 34.

The inward motion of the flaps 36 is transmitted to the flaps 30 by means of the links 37 so that there is a similar movement of these flaps 30. The extent of this latter motion and its relation to the motion of the iris 36 being predetermined by the positioning of the link 37.

Figure 6 discloses another embodiment of the motion transferring means between the flaps. In this embodiment, the flaps 36 are provided with bracket carried rollers 56. The rollers engage cams 55 on the iris 30 and transmit motion as determined by the shape and position of the cams.

In Figure 7, the cams 57 on the ejector sleeve 34 are moved rearwardly with the sleeve depressing the bracket carried rollers 58 to close the iris.

During operation of the afterburner apparatus 11, the ejector sleeve 34 is moved to its rearmost position by the fluid motors 38. This position is shown in Figure 1 wherein a portion of the sleeve projects beyond the airframe fuselage or wing 1. The sleeve in this rearmost position positions the control linkage so that the flaps 36 extend straight out along with the flaps 30. The flaps 30 in the case of the embodiment in Figures 3 and 4 respond to the position of the flaps 36 by virtue of the link 37, while in the embodiments in Figures 6 and 7 the pressure of the high velocity gases being exhausted forces the flaps 30 out when there is no restraint by virtue of the flaps 36 and their cam connection forcing them inwardly. Thus, the maximum flow area of the nozzle 29 is rendered available. Atmospheric air will be caused to flow through the annular opening 34a, between the sleeve 34 and casing 27, discharging from 34b for dissipating heat from the casing.

When it is desired to reduce the exhaust nozzle opening, the sleeve 34 is pulled forwardly by the motors 38. The forward motion of the sleeve pulls the bracket 42 forwardly also causing the lever 40 to pivot about and slide in the bracket 46 fixed to the afterburner casing. The link 47 moves forwardly pulling the unison ring 49 and pivoting the flaps 36 inwardly about their pivot on the sleeve 34. The motion of the flaps 36 is transferred to the flaps 30 in accordance with the predetermined relationship fixed by the position of the link of Figure 3 or the cams of Figures 6 and 7 and both irises will be closed resulting in the streamlined structure shown in Figure 2.

The device thus provided enables a reduction of drag from 8% to 2% of engine thrust and provides a means for controlling the flow of afterburner cooling air.

Obviously many modifications and variations of the present invention are possible in the light of the above teachings. It is therefore to be understood that within the scope of the appended claims the invention may be practiced otherwise than as specifically described.

What is claimed is:

1. A variable ejector for a jet engine having a variable area nozzle, said engine being enclosed by a casing, said ejector comprising a sleeve surrounding the casing of said engine and disposed adjacent the rearward portion thereof; means mounting said sleeve on said casing for longitudinal movement relative thereto; movable closure means connected to said sleeve and overlying said variable area nozzle; and means connected to said casing, said sleeve, and said closure means for operatively controlling the disposition of said closure means, said control means comprising a lever pivotally mounted at one end on said casing, a bracket on said sleeve pivotally connected to the midpoint of said lever, a bar pivotally mounted on the other end of said lever, a unison ring operatively connected to said bar, and pivoted links connecting said unison ring to said closure means.

2. In combination, a jet engine, a first plurality of pivoted plates mounted on said engine adjacent the exhaust nozzle thereof forming a variable area exhaust opening, an ejector sleeve surrounding said engine adjacent the exhaust nozzle and spaced therefrom to form a passage for the flow of cooling air, a second plurality of pivoted plates connected to said ejector sleeve overlying said variable area exhaust opening whereby the rearward portion of said ejector may be varied in cross-sectional area; and means for controlling the pivotal disposition of the second plurality of plates, said control means comprising a lever pivoted at one end to the engine, a bracket on said ejector sleeve pivotally connected to the midpoint of said lever, a bar pivotally mounted on the other end of said lever, a unison ring operatively connected to said bar, pivoted links connecting said unison ring to the second plurality of plates so that movement of the ejector sleeve operates the second set of plates, and means controlling movement of the ejector sleeve along the longitudinal axis of the engine.

3. The combination as in claim 2 and further including means operatively connecting said first and second plurality of pivoted plates.

4. The combination as in claim 3 wherein the means operatively connecting said first and second plurality of pivoted plates comprises a cam and cam follower means.

5. The combination as in claim 3 wherein the means operatively connecting said first and second plurality of pivoted plates comprises links pivotally connecting every other plate of the first plurality of pivoted plates to every other plate of the second plurality of pivoted plates so that the ends of the plates in each set of plates overlie the intermediate plates so that movement in any of the plates will be transmitted to every one of the other plates.

References Cited in the file of this patent

UNITED STATES PATENTS

| 2,597,253 | Melchoir | May 20, 1952 |
| 2,796,731 | Morley et al. | June 25, 1957 |

FOREIGN PATENTS

| 998,358 | France | Sept. 19, 1951 |
| 700,754 | Great Britain | Dec. 9, 1953 |